Figure 1:
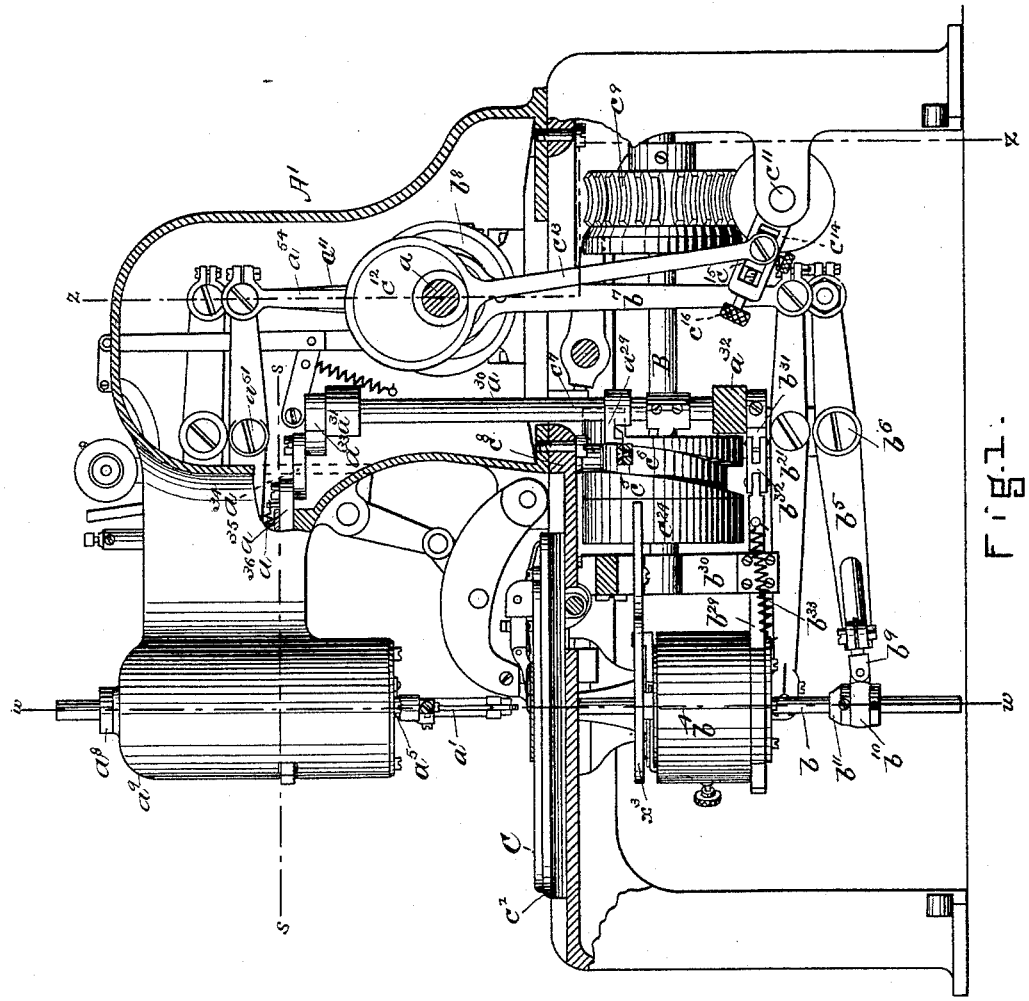

(No Model.) 12 Sheets—Sheet 1.

J. H. REED & C. A. DAHL.
BUTTON HOLE STITCHING AND BARRING MACHINE.

No. 450,844. Patented Apr. 21, 1891.

WITNESSES.
J. M. Dolan
A. B. Merrill.

INVENTORS.
James H. Reed
Chas. A. Dahl
by their attys
Clark & Raymond (No Model.) 12 Sheets—Sheet 2.

J. H. REED & C. A. DAHL.
BUTTON HOLE STITCHING AND BARRING MACHINE.

No. 450,844. Patented Apr. 21, 1891.

WITNESSES.
INVENTORS.

(No Model.) 12 Sheets—Sheet 4.

J. H. REED & C. A. DAHL.
BUTTON HOLE STITCHING AND BARRING MACHINE.

No. 450,844. Patented Apr. 21, 1891.

WITNESSES
J. N. Dolan
A. B. Merrill

INVENTORS
James H. Reed
Chas. A. Dahl
by their attys
Clark & Raymond (No Model.) 12 Sheets—Sheet 5.

J. H. REED & C. A. DAHL.
BUTTON HOLE STITCHING AND BARRING MACHINE.

No. 450,844. Patented Apr. 21, 1891.

WITNESSES.
INVENTORS.

(No Model.) 12 Sheets—Sheet 6.
J. H. REED & C. A. DAHL.
BUTTON HOLE STITCHING AND BARRING MACHINE.
No. 450,844. Patented Apr. 21, 1891.
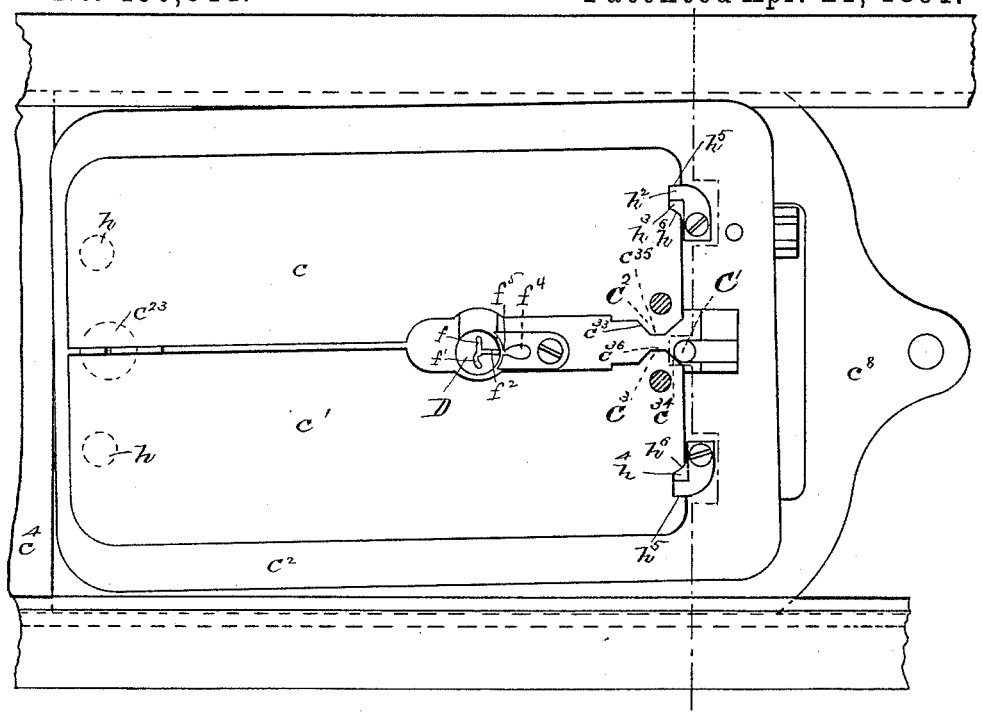
Fig-6.
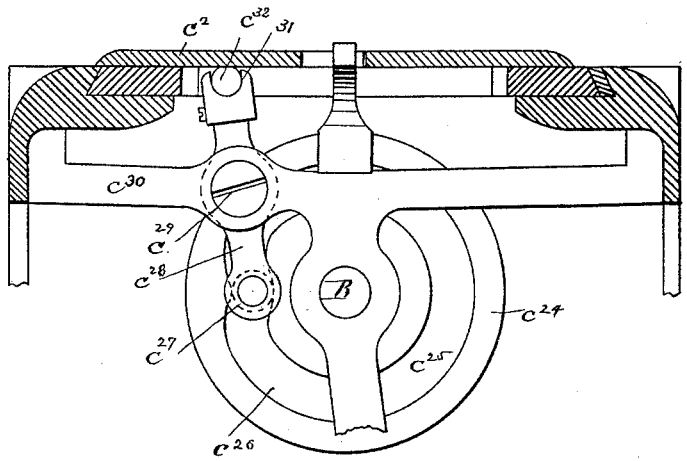
Fig-7-
WITNESSES.
K. H. Dolan
A. B. Merrill.
INVENTORS.
James H. Reed
Chas. A. Dahl
by their atty
Charles L. Raymond (No Model.) 12 Sheets—Sheet 7.
J. H. REED & C. A. DAHL.
BUTTON HOLE STITCHING AND BARRING MACHINE.
No. 450,844. Patented Apr. 21, 1891.
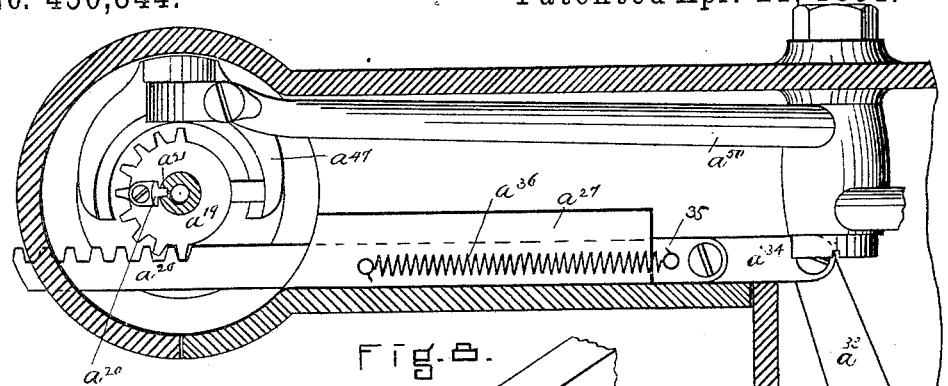
Fig. 8.
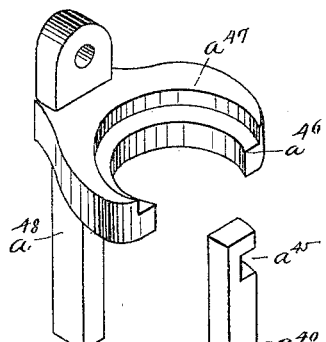
Fig. 11.
Fig. 12.
Fig. 13.
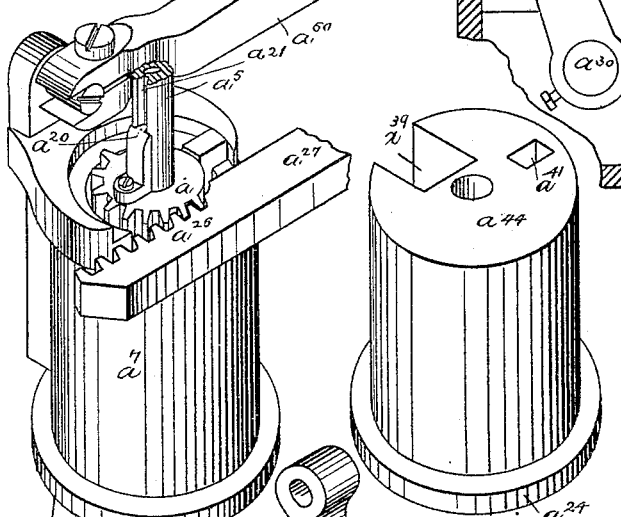
Fig. 9.
Fig. 10.
Fig. 14.
WITNESSES.
J. W. Dolan
A. B. Merrill
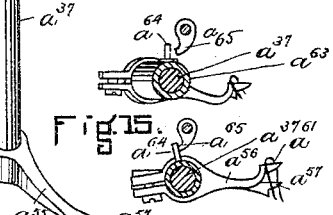
Fig. 15.
Fig. 16.
INVENTOR.
James H. Reed
Chas. R. Dahl
by their attys
Clarkson Raymond (No Model.) 12 Sheets—Sheet 8.

J. H. REED & C. A. DAHL.
BUTTON HOLE STITCHING AND BARRING MACHINE.

No. 450,844. Patented Apr. 21, 1891.

(No Model.) 12 Sheets—Sheet 9.
J. H. REED & C. A. DAHL.
BUTTON HOLE STITCHING AND BARRING MACHINE.
No. 450,844. Patented Apr. 21, 1891.
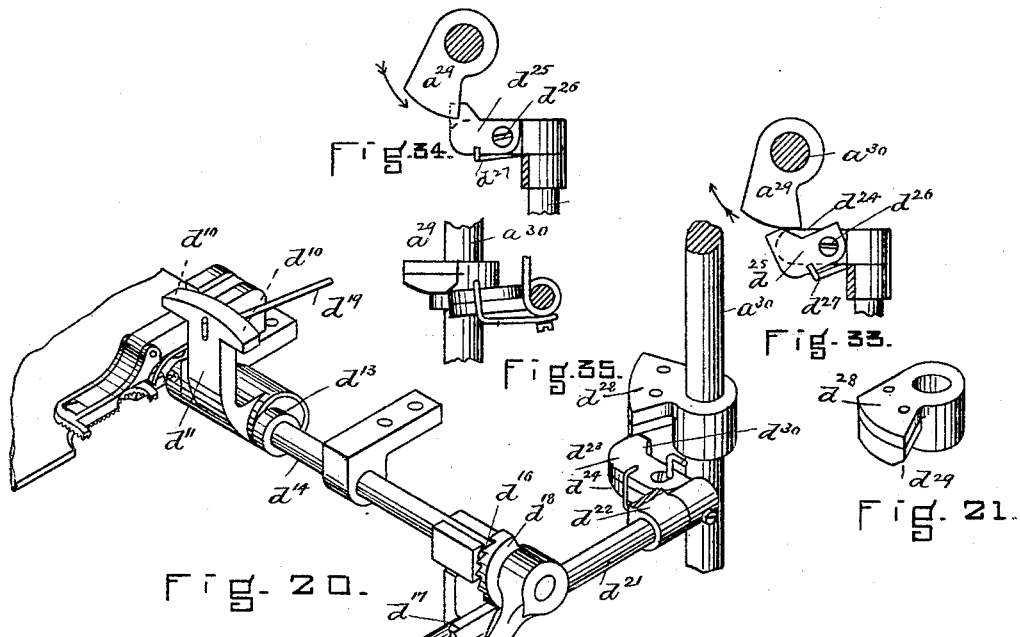
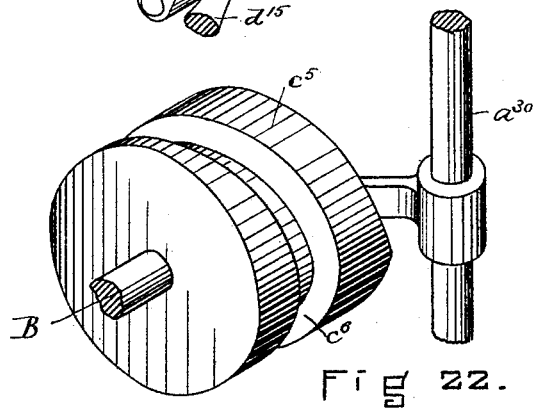
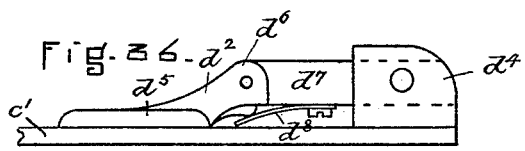
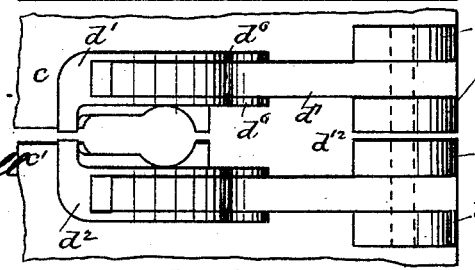

(No Model.) 12 Sheets—Sheet 10.

J. H. REED & C. A. DAHL.
BUTTON HOLE STITCHING AND BARRING MACHINE.

No. 450,844. Patented Apr. 21, 1891.

WITNESSES.
J. M. Dolan
A. B. Merrill

INVENTOR.
James H. Reed
Chas. A. Dahl
by their attys
Clarke & Raymond (No Model.) 12 Sheets—Sheet 11.
J. H. REED & C. A. DAHL.
BUTTON HOLE STITCHING AND BARRING MACHINE.

No. 450,844. Patented Apr. 21, 1891.

(No Model.)  12 Sheets—Sheet 12.

J. H. REED & C. A. DAHL.
BUTTON HOLE STITCHING AND BARRING MACHINE.

No. 450,844.  Patented Apr. 21, 1891.

WITNESSES.
J. M. Dolan
L. M. Hunnewell

INVENTOR.
James H. Reed
Charles A. Dahl
by their Atty
Clarke & Raymond

UNITED STATES PATENT OFFICE.

JAMES H. REED AND CHARLES A. DAHL, OF LYNN, MASSACHUSETTS, ASSIGNORS TO THE GLOBE BUTTONHOLE MACHINE COMPANY, OF KITTERY, MAINE.

BUTTON-HOLE STITCHING AND BARRING MACHINE.

SPECIFICATION forming part of Letters Patent No. 450,844, dated April 21, 1891.

Application filed May 6, 1889. Serial No. 309,729. (No model.)

*To all whom it may concern:*

Be it known that we, JAMES H. REED and CHARLES A. DAHL, both of Lynn, in the county of Essex and State of Massachusetts, citizens of the United States, have invented a new and useful Improvement in Button-Hole Stitching and Barring Machines, of which the following is a full, clear, and exact description, reference being had to the accompanying drawings, forming a part of this specification, in explaining its nature.

The invention relates to an improvement in button-hole stitching and barring machines involving various details of construction and operation, all of which will be hereinafter fully described.

Figure 2:
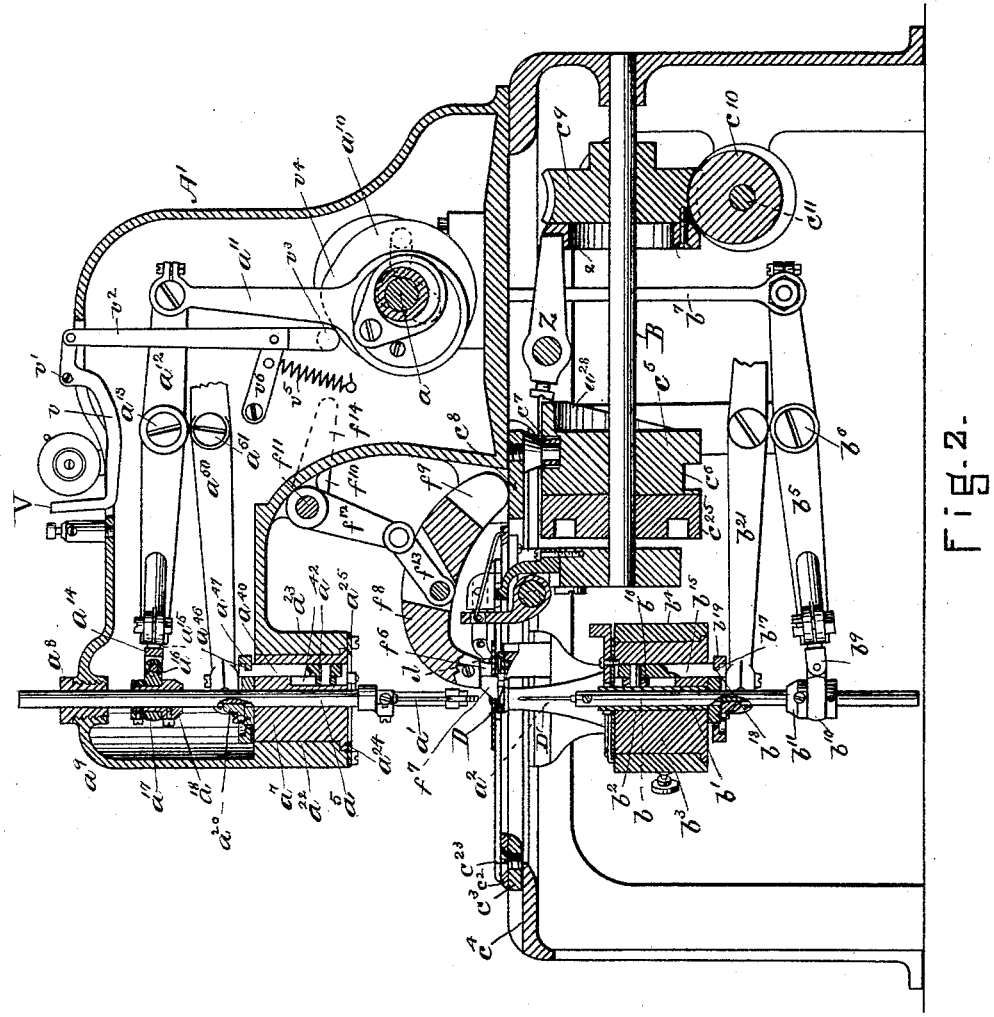
Figure 3:
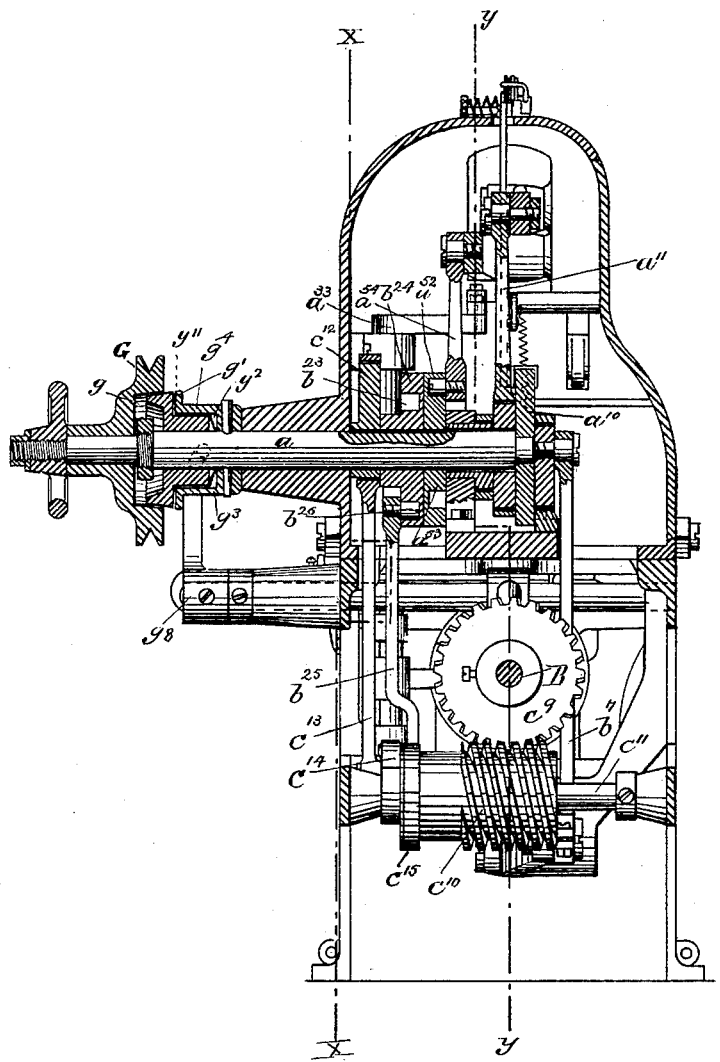
Figure 4:
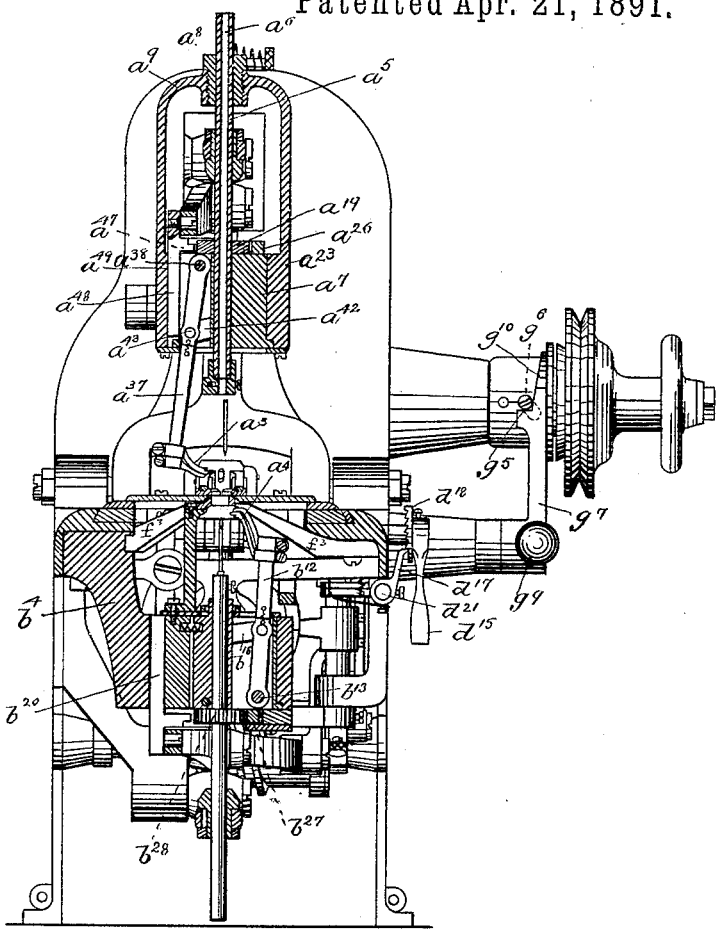
Figure 32:
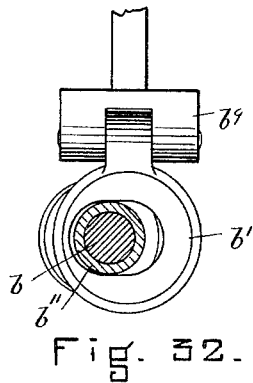
Figure 30:
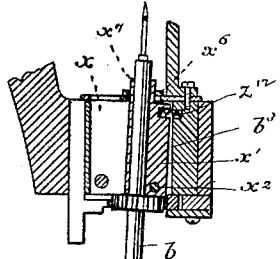
Figure 31:
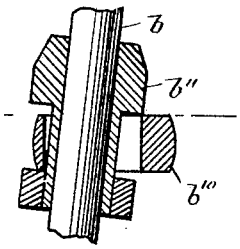
Figure 5:
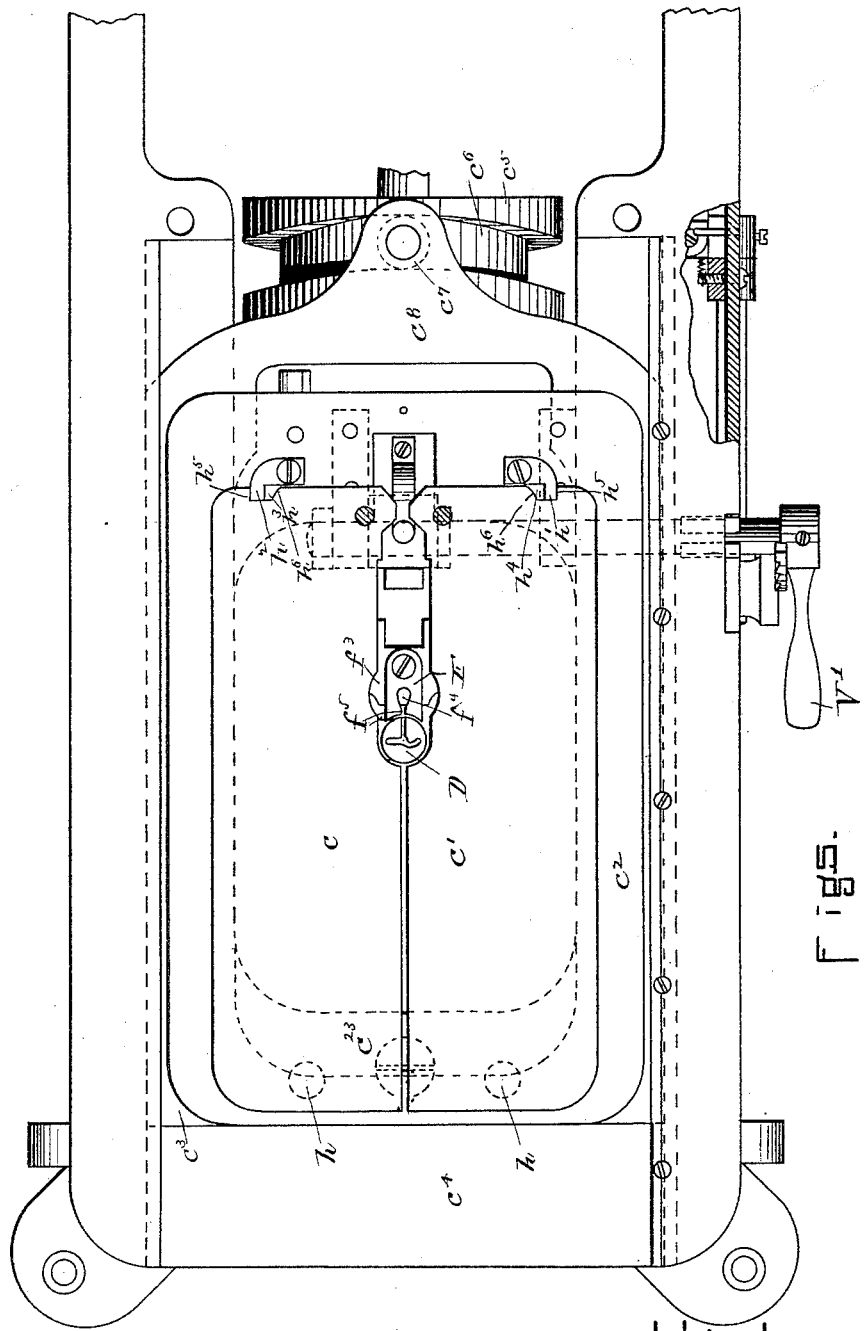
Figure 17:
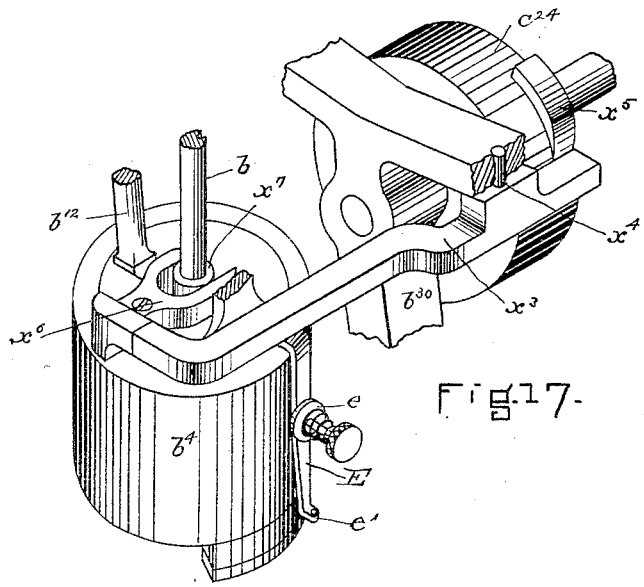
Figure 18:
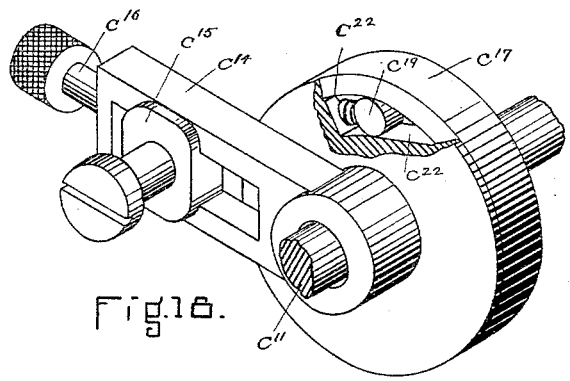
Figure 19:
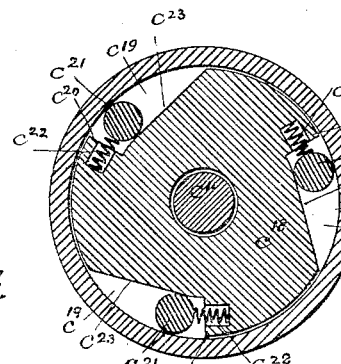
Figure 23:
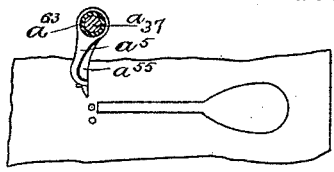
Figure 24:
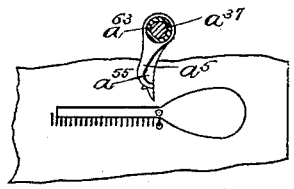
Figure 25:
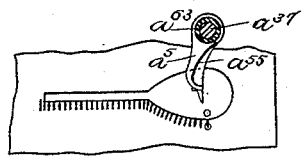
Figure 26:
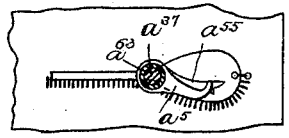
Figure 27:
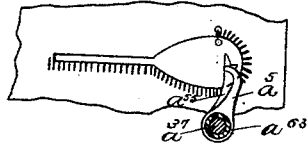
Figure 28:
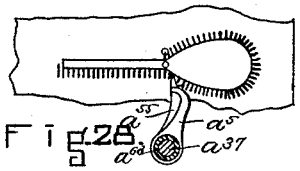
Figure 29:
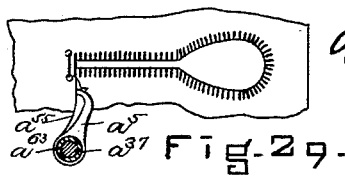
Figure 38:
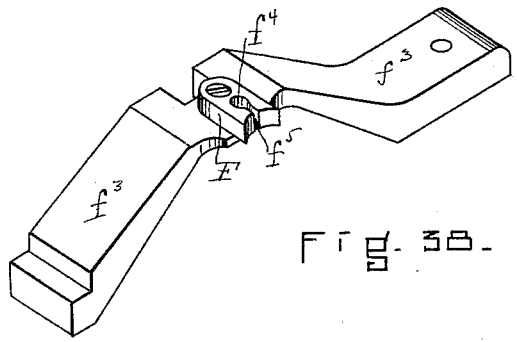
Figure 39:
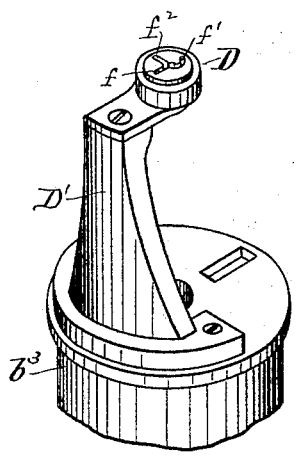
Figures 40, 41:
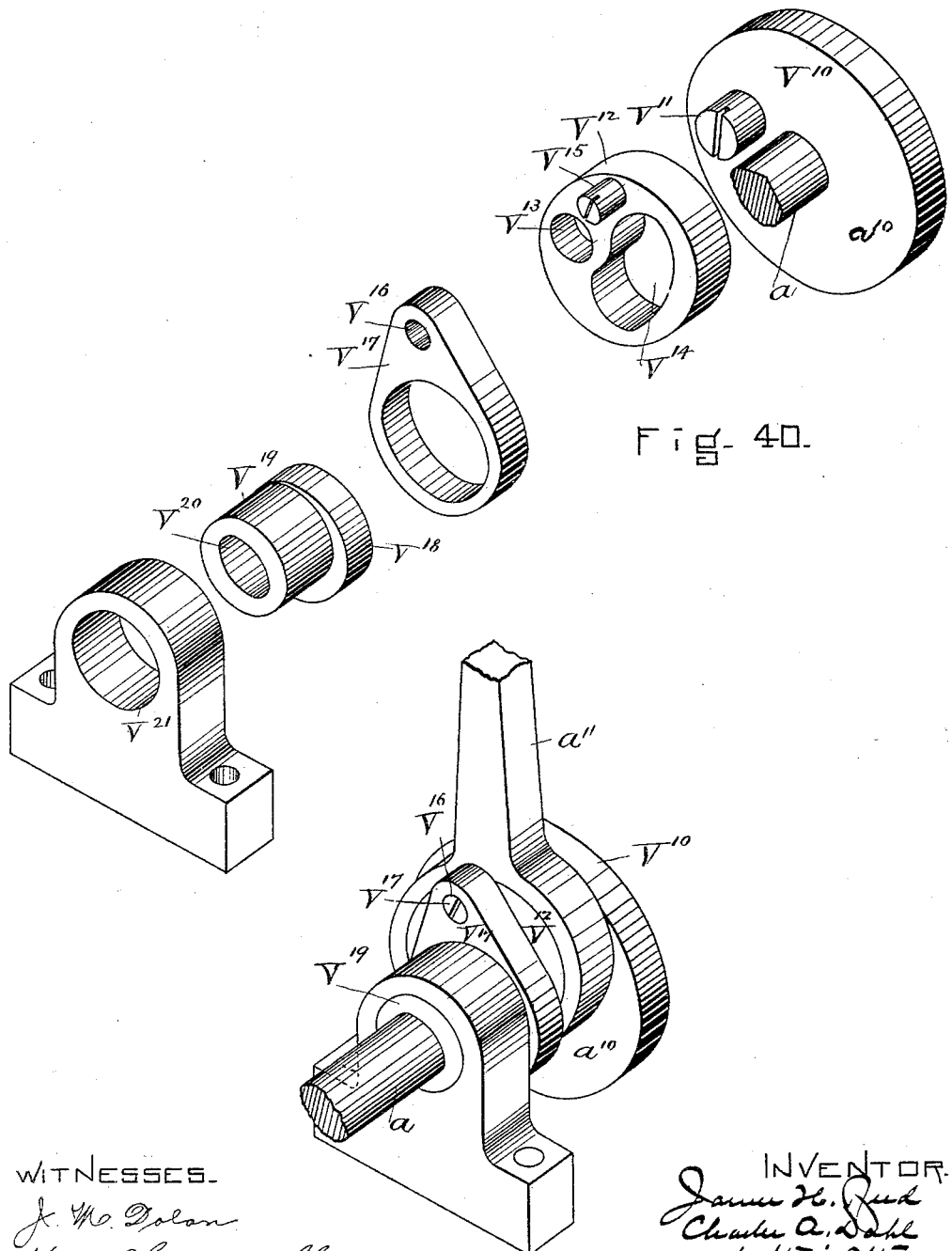

In the drawings, Figure 1 is a vertical section upon the line $x\ x$ of Fig. 3. Fig. 2 is a view in vertical section upon the line $y\ y$ of Fig. 3. Fig. 3 is a view in vertical section upon the line $z\ z$ of Fig. 1. Fig. 4 is a view in vertical section upon the line $w\ w$ of Fig. 1. Fig. 5 is a plan view, enlarged, of the bed, clamp-plate, and other parts. Fig. 6 is also a view in plan of a portion of the bed and clamp-plate. Fig. 7 is a view in vertical section upon the line $v\ v$ of Fig. 6. Fig. 8 is a horizontal section on the line $s\ s$ of Fig. 1. Figs. 9 to 16, inclusive, are detail views representing the needle and looper operating devices. Fig. 17 is a detail view in perspective of a portion of the barring mechanism. Figs. 18 and 19 are views relating to the manner of imparting motion to the worm-shaft operating the clamp-plate feed-cam. Figs. 20 and 21 relate to mechanism for operating the clamps. Fig. 22 illustrates the clamp-plate feeding-cam, and cam for operating to rotate the upper and lower needle and looper-holding barrel. Figs. 23 to 29, inclusive, represent various positions of the clamp-plate and upper looper in relation to the throat of the machine at various times in the stitching of the button-hole. Figs. 30, 31, and 32 represent detail views illustrating the manner of moving the lower needle-bar to sew a barring-stitch. Figs. 33, 34, and 35 are detail views of the latching mechanism to unlatch the clamps. Figs. 36 and 37 are views to illustrate the work-clamps. Fig. 38 is a view in perspective of a portion of the cutter-anvil and its support. Fig. 39 is a view in perspective of the throat piece or button and of its support. Fig. 40 is a view in perspective of the parts of the compound eccentric separated from each other; and Fig. 41 is a view in perspective of the compound eccentric assembled.

Referring to the drawings, A represents the base of the machine, and A' a hollow bracket or arm fastened to the rear end of the base A.

$a$ is the main or pulley shaft of the machine, and it has suitable bearings in the bracket A'.

$a'$ is the upper eye-pointed needle.

$a^2$ is the lower eye-pointed needle.

$a^3$ is the upper looper, (see Fig. 4,) and $a^4$ the lower looper.

The upper needle and looper and lower needle and looper are supported and operated in the same position during the stitching of each side of the button-hole from its rear end to the beginning of the eye, and are then turned about the eye. We will first describe the mechanism for operating the upper needle and looper.

The needle $a'$ is secured to the needle-bar $a^5$, to be held or supported out of line with its center. The needle-bar is preferably hollow or tubular, its bore $a^6$ serving as a passage through which the upper thread passes to the upper needle. The needle-bar has a bearing in the barrel $a^7$ and in the bearing piece or block $a^8$, which is represented as made in the form of a screw-sleeve, which screws into the top of the forward end $a^9$ of the bracket. (See Fig. 2.) The needle-bar is reciprocated by means of a compound eccentric $a^{10}$ (see Fig. 3) on the main shaft $a$, a pitman or link $a^{11}$ connecting the eccentric with the lever $a^{12}$, the said lever pivoted at $a^{13}$ and connected with the needle-bar $a^5$ by means of a link $a^{14}$, one end $a^{15}$ of which enters a hole in the end of the lever and has longitudinal movement or play in relation thereto, and the other end of which is connected with the ear $a^{16}$ of a collar $a^{17}$, containing or encompassing a sleeve $a^{18}$, rigidly fastened to the needle-bar $a^5$. The compound eccentric is composed of the disk $v^{10}$, made fast to the shaft $a$ and having an eccentric-pin $v^{11}$, upon which is mounted the eccentric $v^{12}$, the eccentric having a hole $v^{13}$ of a size to receive the pin $v^{11}$, and the outer hole $v^{14}$, through which the shaft $a$ passes and which is of sufficient size to permit the movement of the eccentric in relation to the shaft. The eccentric $v^{12}$ has a pin $v^{15}$, which enters the hole $v^{16}$ in the eccentric-strap $v^{17}$, and this eccentric-strap is mounted upon the eccentric $v^{18}$, which is formed at the end of a sleeve $v^{19}$, and has a hole $v^{20}$, through which the shaft $a$ extends. This sleeve is mounted in the block $v^{21}$. (See Figs. 40 and 41.) The eccentric $v^{12}$ is surrounded by an eccentric-strap formed on the pitman $a^{11}$. The effect of these two eccentrics upon the pitman and needle-bar is to cause the needle-bar to travel more slowly during the upper portions of its stroke and more rapidly during the lower portions of its stroke. The mechanism for rotating or turning the needle-bar, needle, and upper looper comprises the barrel $a^7$, (see Figs. 8, 9, and 10,) the gear $a^{19}$, secured to the barrel and having a feather $a^{20}$, which enters a vertical groove or recess $a^{21}$ in the needle-bar $a^5$. This barrel is cylindrical in form and fits the cylindrical recess $a^{22}$ in the downward-extending part $a^{23}$ of the front portion of the bracket A', and it has at its lower end an outwardly-extending flange $a^{24}$, fitting a corresponding recess in the lower end of said part $a^{23}$, and the barrel is secured in place by an annular cap-plate $a^{25}$, (see Figs. 1, 2, and 4,) screwed or secured to the under surface of the part $a^{23}$. A rack $a^{26}$ upon the end of the rack-bar $a^{27}$ (see Figs. 8 and 9) engages the teeth of the gear $a^{19}$ and serves to hold the barrel stationary during a portion of the operation of the needle and looper and also to turn them. The rack-bar has suitable bearings in the bracket A' and is provided with movement at the desired interval of time by means of the cam $a^{28}$ on the shaft B, and connecting devices comprising a lever $a^{29}$, the inner end of which is held in contact with the cam, the vertical shaft $a^{30}$ having bearings in brackets $a^{31}$ $a^{32}$, (see Fig. 1,) the crank-arm or lever $a^{33}$ at the upper end of said rod, and the link $a^{34}$ connecting the end of said crank or lever with the rear end $a^{35}$ of said rack-bar. The cam $a^{28}$ has an intermittent or progressive movement imparted to it, as will hereinafter appear. A spring $a^{36}$, (see Figs. 1 and 8,) connecting the rear end $a^{35}$ of the rack-bar with the bracket-arm serves to hold and maintain the arm or lever $a^{29}$ in contact with the cam $a^{28}$. As the motion communicated to the cam $a^{28}$ is intermittent, the movement communicated to the rack-bar is also intermittent, so that during its operation it is moved in one direction—that is, while the sewing is proceeding it is moved inward progressively or intermittingly—that is, first a period of movement and then rest, and so on. This provides the upper needle and upper looper with the progressive turning movement or rotation by successive steps necessary to the best operation of the machine.

The upper looper $a^3$ is provided with a movement which is practically horizontal across the line of reciprocation of the lower needle, and also turns with the upper needle during the stitching of the eye of the button-hole. These movements are given it in the following way: The looper is of the necessary shape and construction to enter the loop presented to it by the lower needle, and to spread and hold it during the downward movement of the upper needle and to then release it, and it is fastened at the lower end of a lever $a^{37}$. (See Figs. 4, 9, 13, and 14.) This lever is pivoted at $a^{38}$ (see Fig. 4) to the barrel $a^7$, the upper end of the lever extending into a vertical recess $a^{39}$, formed in said barrel. (See Fig. 10.) There is also carried by the barrel a slide $a^{40}$, (see Fig. 12,) which is contained in the hole $a^{41}$ of the barrel. (See Fig. 10.) This slide has pivoted to its lower end a link $a^{42}$, which extends across a recess in the lower part of the barrel (not shown) to the looper-lever $a^{37}$, and is pivoted thereto at $a^{43}$. (See Fig. 4.) This slide $a^{40}$ has its upper end extending above the upper surface $a^{44}$ of the barrel, and there is formed in the upper end a recess $a^{45}$, (see Fig. 12,) which receives a flange $a^{46}$ upon the yoke $a^{47}$. (See Fig. 11.) This yoke is attached to or formed upon a slide-bar $a^{48}$, which has suitable bearings in a vertical recess $a^{49}$ (see Fig. 4) in the part $a^{23}$ of the bracket, and the yoke and slide are provided with a vertical movement or reciprocation, but not with a rotary movement, the bar $a^{40}$ being carried by the barrel $a^7$, and rotating or turning upon the flange $a^{46}$ of the yoke, so that the yoke, while it provides the slide $a^{40}$ with a reciprocating or vertical movement, does not turn with it. The slide $a^{48}$ and yoke $a^{47}$ are given the necessary vertical movement by means of the lever $a^{50}$, (see Figs. 1, 2, 8, and 9,) which is pivoted to the bracket A' at $a^{51}$, and is connected with its operating cam-groove $a^{52}$ in the cam $a^{53}$ on the main shaft $a$ by the link $a^{54}$, which has a cam-pin entering the cam-groove, and is connected at its upper end with the rear end of said lever. (See Fig. 3.) The cam is timed to communicate motion to the looper at the desired interval, and this movement is communicated by means of the lever to the yoke $a^{47}$ and slide $a^{40}$, the upward and downward vertical movements of the slide causing the link $a^{42}$ to act to draw the looper-lever $a^{37}$ in one direction or to push it in the reverse direction, according as the slide is moved up or down.

While any suitable form of looper may be used, we have represented one which comprises two parts—namely, the engaging section $a^{55}$ (see Fig. 13) and the spreader $a^{56}$. The engaging arm or part has the pointed end $a^{57}$, the curved edge $a^{58}$, extending back from said pointed end and the shoulder $a^{59}$, and is rigidly secured to the end of the looper-lever $a^{37}$. The spreading-arm $a^{56}$ has the pointed end $a^{60}$, (see Figs. 9, 14, and 16) which is similar in shape to the pointed end $a^{57}$ $a^{58}$ of the other section, and also a straight edge $a^{61}$, (see Fig. 16,) and it extends from the lower edge of the curved end $a^{62}$ of the arm $a^{56}$, which is rigidly secured to a sleeve $a^{63}$, adapted to be turned upon the looper-lever $a^{37}$ after both points $a^{57}$ $a^{60}$ have entered the loop of the looping mechanism to move the point $a^{61}$ away from the point $a^{57}$, thereby causing the loop to be spread or opened. This is accomplished by securing to the sleeve $a^{63}$ a pin $a^{64}$, (see Figs. 15 and 16,) so arranged as to strike upon the movement of the looper-lever $a^{37}$ at the proper interval in its movement, a stop $a^{65}$, fastened to the under surface of the barrel $a^{7}$, and upon the backward movement of the looper-lever the point $a^{61}$ is moved into line with the point $a^{57}$ by a spring $a^{66}$.

The lower needle $a^{2}$ and the lower looper $a^{4}$ are provided with movements similar to those given the upper needle $a'$ and looper $a^{3}$ by the same mechanism, and it is only necessary to briefly refer to such parts.

$b$ is the lower needle-bar. The needle $a^{2}$ is fastened centrally to its upper end. The needle-bar has bearings in a sleeve $b'$, carried in a slot $b^{2}$ in the barrel $b^{3}$. The barrel is supported by the bracket $b^{4}$. The needle-bar is reciprocated by means of the lever $b^{5}$, pivoted at $b^{6}$, the link $b^{7}$, and the compound eccentric $b^{8}$ on the pulley-shaft $a$. (See Fig. 1.) The compound eccentric $b^{8}$ is essentially the same as the compound eccentric $a^{10}$, hereinbefore described, for giving a differential movement to the needle-bar $a^{5}$. The lever $b^{5}$ is connected with the needle-bar by means of the link $b^{9}$, collar $b^{10}$, and sleeve $b^{11}$. The lower looper $a^{4}$ is secured to the upper end of the looper-lever $b^{12}$, (see Fig. 4,) which is pivoted at $b^{13}$ to the lower barrel $b^{3}$, extending into a recess $b^{14}$ formed therein, and it is provided with a horizontal movement by means of a slide $b^{15}$, connecting with the lever $b^{12}$ by a link $b^{16}$. (See Figs. 2 and 4.) The slide $b^{15}$ extends below the under surface of the drum $b^{3}$, has the notch $b^{17}$, which receives the flange $b^{18}$ of the lower yoke $b^{19}$. This lower yoke $b^{19}$ is carried at the end of the slide $b^{20}$, (see Fig. 4,) which slides in a hole formed in the bracket $b^{4}$, and it is operated by the lever $b^{21}$, pivoted at $b^{22}$, and the cam-groove $b^{23}$ in the cam-disk $b^{24}$ on the main shaft $a$ and the link $b^{25}$, (see Fig. 3,) which has a cam-pin $b^{26}$ to enter said cam-groove $b^{23}$, and is connected at its lower end with the lever $b^{21}$. The barrel $b^{3}$ is intermittingly turned or partially rotated by means of the rack $b^{27}$ and the gear $b^{28}$, secured to the barrel and having a pin which enters a groove in the needle-bar $b$. The rack is formed at the end of the rack-bar $b^{29}$, (see Figs. 1 and 4,) and the rack-bar has a bearing in the lower part of the bracket $b^{4}$ and of the bracket $b^{30}$, and is moved by the cam $a^{28}$ through the medium of the lever $a^{29}$, rod $a^{30}$, and crank-arm $b^{31}$ upon the lower end of said rod, which is connected with the rack-bar $b^{29}$ by a link $b^{32}$. (See Fig. 1.) A spring $b^{33}$ co-operates with the spring $a^{35}$ in holding the lever $a^{29}$ in contact with its operating-cam and also in causing the automatic return of the upper and lower barrels, both needles, and looping devices to their original position upon the completion of the stitching of the button-hole, as will appear.

The lower looper $a^{4}$ preferably is similar in construction and operation to that of the upper looper, as shown in Figs. 9, 13, 14, 15, and 16—that is, it is made in two parts and adapted to be operated to enter the loop of the upper thread and spread it in the same manner as the upper looper acts in connection with the loop of the lower thread. To sew a barring-stitch, the lower needle-bar $b$ is provided with a traversing movement at the end of the stitching of the last side of the button-hole to increase the distance between the lines of reciprocation of the two needles. To enable this to be accomplished, we provide for a slight lateral movement of the needle-bar $b$ in the lower barrel $b^{3}$, in order that it may be moved at the proper interval from the plane in which it reciprocates during the stitching of the sides and eye to a plane farther distant from the plane of reciprocation of the upper needle. The lower barrel $b^{3}$ is therefore represented as provided with a cross slot or recess $x$, (see Fig. 30,) and the needle-bar $b$ passes through a block $x'$, pivoted at its lower end at $x^{2}$ to the barrel $b^{3}$. This block is provided with a sufficient swinging movement upon its pivot $x^{2}$ in the slot $x$ to move the lower needle, as above specified, and this movement is communicated to the pivoted block $x'$ by means of a lever $x^{3}$, (see Fig. 17,) pivoted at $x^{4}$, and moved by a cam projection $x^{5}$ on the cam-disk $c^{24}$. This cam $x^{5}$ is so located and shaped as to cause the lever to move the swinging block at the completion of the stitching of the last side of the button-hole and to hold the block during the stitching of three or four barring-stitches, and to then permit the lever to be immediately returned to its normal position to return the needle-block $x'$ and the needle-bar $b$ to their original position, and this is done by a spring $z^{12}$ acting upon the lever $x^{3}$. (See Fig. 30.) The lever preferably is shaped as represented in Fig. 17—that is, it extends somewhat beyond the barrel, and has at its end a yoke-piece $x^{6}$, the arms of the yoke spanning a cylindrical boss $x^{7}$ at the upper end of the block $x'$. (See Figs. 17 and 30.) The connection between the sleeve $b^{11}$ and collar $b^{10}$ is made loose or free, as represented in Figs. 30 and 31, to permit the inclination of the sleeve and needle-bar $b$ in relation to the collar when moved to the barring position.

$C$ is the clamp-plate. (See Figs. 1, 5, 6, and 37.) It preferably is made in two longitudinal parts or sections $c$ $c'$, which are mounted upon a plate $c^{2}$, from which the center has been removed, leaving a rim only, and which plate $c^2$ is fastened to a slide $c^3$. This slide $c^3$ is fitted to a dovetail bed $c^4$ in the forward part of the base A, and it is given a step-by-step feed movement toward and from the needles or sewing mechanism by means of the cylinder-cam $c^5$, having the cam-groove $c^6$, with which the cam-pin $c^7$, carried upon the extension $c^8$ of said slide $c^3$, engages. The cam $c^5$ is constructed or formed to impart a movement of the slide toward the needle, a slight period of rest while the end of the eye of the button-hole is being stitched, and a return movement to its original position. Movement is imparted to the cam $c^5$ by means of the shaft B, to which it is secured, the shaft being intermittingly rotated or turned by means of the worm-wheel $c^9$, and the shaft $c^{11}$ is caused to be intermittingly rotated by means of the eccentric $c^{12}$ on the pulley-shaft $a$, the eccentric strap, arm, or link $c^{13}$, the lever $c^{14}$, to which the lower end of the cam $c^{13}$ is connected by means of a slide-block $c^{15}$, sliding in a long slot in the lever, and adjustable by means of a screw $c^{16}$, whereby the end of the said arm $c^{13}$ is made adjustable in relation to the center of the shaft $c^{11}$ and the length of the movement of the lever $c^{14}$ varied. The lever $c^{14}$ (see Fig. 18) is pivoted to the shaft $c^{11}$, and has secured to it to surround the shaft a cylindrical case $c^{17}$. There is contained in this case a block $c^{18}$, which is fastened to the shaft $c^{11}$, and which has recesses $c^{19}$ formed in its edge, three being shown. These recesses $c^{19}$ extend to the shoulders $c^{20}$, and are of a depth each to receive a steel roll $c^{21}$, and they gradually decrease in depth from a point adjacent to said shoulder to the circumference of the block. There are also arranged to bear against the rolls $c^{21}$ springs $c^{22}$, which are partly held in recesses or pockets extending inward from the shoulders $c^{20}$. The rolls $c^{21}$ are held between the tangential surfaces $c^{23}$ of the block and the inner surface of the case $c^{17}$, and upon the movement of the case $c^{17}$, caused by the lever $c^{14}$ in a direction toward the shoulders $c^{20}$ of the block $c^{16}$, the rolls move or are turned toward the said shoulders, and no movement is imparted to the block $c^{18}$ and the shaft $c^{11}$; but upon the reverse movement of the lever $c^{14}$ the rolls immediately wedge between the surfaces $c^{23}$ and the inner surface of the case, and movement is at once imparted by the lever to the block $c^{18}$ and the shaft $c^{11}$. By means of the springs the rolls $c^{21}$ are always held in position to immediately wedge between the block and the case upon the feeding movement of the lever, so that there is no lost motion between the parts. This connection is of course similar to a pawl-and-ratchet construction, but is better than that, as it is more positive, reliable, and active. Its effect, however, upon the shaft $c^{11}$ is the same, as it provides it with a progressive or step-by-step movement of rotation, and this movement is continued through the worm-wheel, worm, and shaft B to the cam $c^5$ and other parts carried by said shaft, of which the cam $a^{28}$ to rotate the barrels $a^7$ $b^3$ is one.

It is necessary not only that the slide-plate $c^3$ and consequently the clamp-plate C have the movements in relation to the sewing mechanism and the button D (see Figs. 2, 5, and 6) described, but it is also necessary that the clamp-plate during the stitching of the eye of the button-hole shall be moved laterally or crosswise the feeding movement of the plate $c^3$, in order that their combined movement shall cause the material to be moved on a circular, oval, or other path to conform to the enlarged openings at the forward end of the button-hole generally called the "eye." Usually this is circular in shape. This traversing movement is imparted to the clamp-plate C by pivoting the intermediate plate $c^2$ by means of the pivot $c^{23}$ to the slide $c^3$, (see Fig. 2,) and also by means of the cam $c^{25}$ upon the shaft B, (see Fig. 7,) the said cam $c^{25}$ having a cam-groove $c^{26}$, which is entered by a cam-pin $c^{27}$ on the lower end of a lever $c^{28}$, pivoted at $c^{29}$ to a cross-bar $c^{30}$, and which engages by means of a yoke $c^{31}$ at its upper end a pin $c^{32}$, secured to the under surface of the intermediate plate $c^2$. This cam $c^{25}$ is of course timed to move the plate $c^2$, and therefore the clamp-plate, transversely toward and then away from the button and sewing mechanism at the time the clamp-plate feed-cam $c^6$ has fed the clamp-plate to the position when the stitching of the eye begins.

The clamp-plate C has the fabric-holding clamp $d$. This is represented as made in two parts $d'$ $d^2$, one of which is attached to the ears $d^3$ upon the section $c$ of the clamp-plate, and the other of which is attached to the ears $d^4$ (see Figs. 36 and 37) upon the section $c'$ of the clamp-plate, each section of the clamp comprising a presser-foot $d^5$, having a short under surface and upward and backward extending arms $d^6$, by which it is secured to a lever $d^7$, the lever being shaped to extend between the arms and to bear upon the upper surface of the presser-foot, and the arms having slots through which a connecting-pin extends, in order to provide the presser-foot with a yielding movement in relation to the lever, and a spring $d^8$ serves to keep the presser-foot in contact with the lever. The lever is moved upward from its ears by means of a spring $d^8$. (See Fig. 36.) The two parts of the clamp when together are adapted to be drawn downward and locked in position by means of a cross-bar $d^{10}$, extending horizontally from the end of a vertically-movable bar $d^{11}$. This bar extends upward through the recess $d^{12}$ between the two sections $c$ $c'$ of the clamp-plate at their back end, and is provided with a vertical movement by means of an eccentric $d^{13}$ on the shaft $d^{14}$, (see Fig. 20,) the said shaft being operated by means of a lever $d^{15}$, and the locking-bar is latched down by means of a ratchet $d^{16}$ on the said shaft, and a spring latch or pawl $d^{17}$, which engages the teeth of the ratchet, the ratchet-teeth being arranged to extend from the side of the plate $d^{18}$. A spring-rod $d^{19}$, attached at one end to the plate $c^2$ and at the other end to the upper end of the bar $d^{11}$, serves to maintain the locking-bar in vertical position.

It is not only necessary that the clamps should hold the material to the clamp-plate, but it is also necessary that the material be stretched. This is not due to the action of the clamps, but to the action of the clamp-plates $c\,c'$ and to a pin C' (see Figs. 2, 5, and 6,) which is carried upon or formed upon the upper end of a stationary bracket, and extends into a portion of the recess between the two sections $c\,c'$ of the clamp-plate. It will be noticed that each of these sections has near its rear end, facing each other, the two extensions $C^2\,C^3$, each of which has the two inclines $c^{33}\,c^{34}$. It will be remembered that the clamp-plate has, in addition to its forward and backward movements in relation to the sewing mechanism, a slight sidewise or traversing movement, and upon the beginning of the movement of the plate to present the button-hole to be stitched to the sewing mechanism, the incline $c^{33}$ comes in contact with the pin C', and the section $c$ of the plate is caused to be moved laterally in relation to the section $c'$ sufficiently to stretch the material, this, of course, moving one section of the clamp away from the other. The pin then rides upon the straight portion $c^{35}$ of the section $C^3$, holding the section $c$ of the clamp-plate removed from the section $c'$. Upon the reversed movement of the clamp-plate the plate, having been moved transversely meanwhile, brings the incline $c^{34}$ of the section $c'$ in contact with the pin C', when it is moved laterally in relation to the section $c$, which creates, of course, a tension upon the material held by the clamps, and this is maintained by the further contact of the straight section $c^{36}$ with the pin during the movement away of the clamp-plate from the stitching mechanism or the sewing of the last side.

We have also shown mechanism for automatically releasing the latch holding the clamps depressed at the end of the operation of the machine, and it comprises a shaft $d^{21}$, upon which the latch $d^{17}$ is carried. This shaft is supported by the bracket $d^{22}$, which extends from the slide-plate $c^3$, so that the shaft has a horizontal movement, and for this reason the latch $d^{17}$ is made long, as it travels horizontally or laterally in relation to the ratchet $d^{16}$. Upon the rear end of the shaft $d^{21}$ is a latch $d^{23}$, made in two parts—viz., the arm $d^{24}$, which is fast to the shaft $d^{21}$, and the latch $d^{25}$, which is pivoted at $d^{26}$, (see Figs. 20, 33, and 34,) to be swung laterally upon the arm $d^{24}$ in opposition to the spring $d^{27}$. To move the latch $d^{17}$ from engagement with the ratchet $d^{16}$, it is necessary to partly rotate the shaft $d^{21}$, and this is effected by means of the arm $d^{28}$ upon the shaft $a^{30}$. This arm has the inclined cut corner $d^{29}$, (see Fig. 21,) and as the shaft $a^{30}$ is turned at the end of the operation of the machine the arm $d^{28}$ rides upon the upper surface of the swinging arm $d^{25}$ of the latch $d^{23}$, which is then in position over the arm $d^{24}$, and turns the shaft $d^{21}$ sufficiently to throw the catch $d^{17}$ from engagement with the ratchet-teeth $d^{16}$, and this arm $d^{28}$ then passes beyond the section $d^{30}$ of the latch or swinging plate $d^{25}$, so that the swinging plate is moved upward by a spring $d^{27}$ (see Figs. 33 and 34) to its original position, which brings the latch $d^{17}$ into position to be engaged by the ratchet $d^{16}$. Upon the forward movement of the arm $d^{28}$ it strikes the incline $d^{30}$ upon the swinging plate, and instead of depressing or moving downward the arm $d^{24}$, which would cause the catch $d^{17}$ to be disengaged from the ratchet, it swings it horizontally or laterally upon its pivot, (see Fig. 33,) and therefore in its forward movement does not cause the catch to be disengaged from the ratchet.

There is carried by the lower barrel $b^3$ a bent arm E, which carries the tension $e$ and guides $e'$ for the lower thread. (See Fig. 17.) The button D is held or supported at the upper end of a bracket D', attached to the upper surface of the lower barrel $b^3$, to be turned therewith. (See Figs. 2, 4, and 39.) The button has the throats $f\,f'$, which are connected with each other, and the slit $f^2$, which, when the parts are in position for the commencement of the stitching, is in line with the anvil F. The anvil is carried upon or supported by the cross-support $f^3$, and has a hole $f^4$, through which the material which is removed to form the eye of the button-hole is forced by the punch, and a slit $f^5$, into which the remainder of the cutter is forced in forming the button-hole slit in the material. The anvil occupies a position in the recess between the two parts of the clamp-plate $c\,c'$. The punch $f^6$ and slitting-knife $f^7$ are carried by a lever $f^8$. This lever has two arms, each of which is solidly pivoted to the bracket A' at $f^9$, and it is adapted to be operated either by hand or by power immediately before the beginning of the stitching of the button-hole, and we have represented it as operated by means of the bell-crank lever $f^{10}$, pivoted at $f^{11}$ to the bracket A', and having its arm $f^{12}$ connected with the lever $f^8$ by a link $f^{13}$. (See Fig. 2.) The other arm $f^{14}$ of the bell-crank lever is connected by means of a wire or rod (not shown) with a treadle.

The upper thread is carried from a spool about the tension device and through an eye to the passage in the upper needle-bar, and there is arranged a take-up V between the eye and tension, which comprises a lever $v$, pivoted at $v'$ and provided with a link $v^2$, carrying a cam-roll $v^3$ at its lower end, which bears upon the cam $v^4$, by which movement is imparted to the end of the lever $v$ at the required interval. A spring $v^5$, attached to the pivoted arm $v^6$ and connected with the link $v^2$, serves to hold the cam-roll in contact with the cam and to move the take-up end of the lever upward. The machine is started and stopped by means of the driven pulley G, forming one member of a friction-clutch by means of the cavity $g$ and the movable member $g'$ of the clutch. The movable member $g'$ is forced into engagement with the pulley member by means of a spring $g^2$, contained in a chamber $g^3$ in the sleeve $g^4$. The sleeve is pinned to the shaft $a$, and has a slot $g^5$ formed therein, (see Fig. 4,) through which a pin $g^6$, attached to the hub of the movable pulley $g'$, projects. A lever $g^7$, pivoted at $g^8$, having a handle $g^9$ and the pointed or wedge end $g^{10}$, co-operates with the pin $g^6$ to move back or release the movable member $g'$ of the clutch from the other member and this is accomplished by moving the wedge end of the lever into the position represented in Fig. 4, so as to bring the point of the wedge between the shoulder $g^{11}$ on the sleeve $g^4$, and the pin rotating with the shaft and riding upon the inclined end of the lever moves the member $g'$ of the clutch out of engagement with the member G and also holds it out of engagement.

To start the machine it is simply necessary to move the wedge end of the lever by means of the handle $g^9$ from contact with the pin $g^6$. This releases or unlatches the clutch $g'$ and allows the spring $g^2$ to move the member $g'$ into engagement with the pulley member $g$. Each of the two parts $c\ c'$ of the clamp-plate are removable from the intermediate plate $c^2$, and each one is represented as secured in place by means of a dowel-pin $h$, secured to its front end to extend downwardly from its under surface into a pin-hole in the plate $c^2$, (see Figs. 5 and 6,) and also by means of the lugs $h'\ h^2$, fastened to the rear end of the plate $c^2$, one of which (the lug $h^2$) enters a recess $h^3$ in the rear edge of the section $c$ of the clamp-plate, and the other of which enters the recess $h^4$ in the rear edge of the section $c'$. Each of these recesses has a straight edge $h^5$ and an inclined edge $h^6$, and are reversely arranged in relation to each other, and the end of each of the lugs $h'\ h^2$ contained in the said recesses is narrower than the recess. This is for the purpose of permitting each clamp-plate to be moved by the pin and wedge above specified independently of the other, or while the other is held locked by one of the lugs $h'\ h^2$ to thereby spread the button-hole.

The operation of the machine is as follows: The material to be provided with the stitched button-hole is placed upon the clamp-plate, and the clamps closed upon it by the turning of the clamp-lever V'. The button-hole eye and slit are then formed by the actuation of the lever $f^8$, carrying the punch and knife, the work-clamps and material and button then being in position to permit the proper movement of the punch and knife in relation to the clamps, the work-plate, the anvil, and the slit in the button. This, as before stated, may be done automatically or by hand. If done by hand, the machine is then set in operation. The first operation of the machine is to stitch one side of the button-hole from the rear end forward toward the eye, and this is caused by the advance or movement of the clamp-plate toward the forward or front end of the machine in a straight line, the two sections of the clamp-plate being separated from each other upon the starting of the machine to properly stretch the material and open the slit. The movements of the needles and looping mechanism are then upon the line represented in Fig. 23, and this position of the loopers and needles is retained until the first side of the button-hole is stitched and the beginning of the eye reached—that is, until the clamp-plate and material reaches the position represented in Fig. 24. The clamp-plate, still feeding, is then moved laterally about one side of the eye, the parts keeping substantially the position represented in Fig. 25, and when the beginning of the semicircular curve at the end of the eye is reached the needles and loopers begin to turn in relation to the material to traverse this semicircular part, while the clamp-plate is moved slightly transversely to assist in the operation, so that at the center of the semicircular movement the position of the parts is well represented in Fig. 26. At the end of this semicircular movement the position of the parts is that represented in Fig. 27, or the reverse of that shown in Fig. 25. From that to the beginning of the stitching of the last side of the button-hole the plate has a compound movement—that is, a feeding movement and the transverse movement—until the parts assume the position shown in Fig. 28, and from that point to the end of the last side of the button-hole the stitching continues, with the parts as therein represented. At the end of the stitching of the last side the lower needle is moved laterally away from the upper needle, or to the position represented in Fig. 29, and two or three barring-stitches, or stitches about double the length of the ordinary stitch, then sewed. At the end of the stitching of the bar or the stitching of the last side, if the button-hole be not barred the needles and loopers are returned automatically to their original position by the riding of the lever $d^{29}$, or the piece between it and its actuating-cam, off the end of the cam to the point of beginning, the cam being shaped to permit this movement to take place. This, together with the action of the cam operating the plate $c^2$, returns the parts to their original position, or in a position to immediately form and stitch a new button-hole. I would say that we do not confine ourselves to the particular mechanism herein specified, but may use any mechanical equivalents therefor.

The advantages of the invention arise from a number of different elements, each of which is of value for its especial work, and their arrangement in an organized machine for conjoint action. Of these elements we would particularly mention the compound eccentrics for operating the upper and lower needles and providing them with suitable movements. This insures great speed combined with the slowing of the movements of the needles at the proper intervals. Another element worthy of mention is the clamp-plate and the cams actuated by a worm-wheel for providing it with the feed movements in relation to the sewing mechanism, which permits a rapidity of action combined with certainty or precision of action and great durability. Another feature is the mechanism for simultaneously turning both needles and their respective looping devices at the required interval. Another is the mechanism by which the respective needles and their looping devices are caused to be automatically returned at the end of the stitching of the button-hole. Still another point is the manner of actuating the cam-shaft B by means of the peculiar mechanism illustrated in Figs. 18 and 19. We would say that while for general use we prefer that both the upper and lower needles and their respective looping devices be employed, that we do not confine ourselves to this organization, as the machine may be run with one needle and its appropriate looping mechanism instead of the two, as any one skilled in the art will immediately observe.

If desired, there may be used to stop the momentum of the machine a latch Z, attached to the shaft carrying the lever $g^7$, which is adapted to be turned thereby into position to enter a notch in the disk $z$, attached to the shaft B, so that upon the disengaging of the driven member of the clutch from the driving member, if there be a continued rotation of the machine due to its momentum, it is stopped upon the shutting of the latch into the notch of said disk.

To vary the length of the button-hole the cam $c^5$ is removed and another cam with a groove of greater or less pitch substituted, according as it is desired that the button-hole be longer or shorter.

Having thus fully described our invention, we claim and desire to secure by Letters Patent of the United States—

1. In a button-hole-stitching machine, the combination of a needle-bar, the needle $a'$, the compound eccentric upon the shaft $a$, the pitman or connecting rod $a^{11}$, and lever $a^{12}$, connected with the pitman and with the needle-bar, substantially as described.

2. In combination, in a button-hole-stitching machine, the upper straight needle $a'$, the needle-bar $a^5$, the compound eccentric upon the shaft $a$, pitman or connecting arm $a^{11}$, and intermediate lever $a^{12}$, with the straight lower needle $a^2$, the needle-bar $b$, and second compound eccentric upon the shaft $a$, the pitman or connecting bar $b^7$, and lever $b^5$, connecting said pitman or bar with the needle-bar $b$, substantially as described.

3. The combination, in a button-hole-stitching machine, of the rotary barrel or block $a^7$, the reciprocating needle-bar $a^5$, mounted in the rotary barrel or block to be rotated therewith, a single eye-pointed needle carried by said bar, the gear $a^{19}$, attached to the upper surface of said barrel, the reciprocating rack-bar $a^{26}$, supported by the head or arm A' of the machine and upon parts of which it slides, the rock-shaft $a^{33}$, a cam $a^{28}$, lever $a^{29}$, link $a^{34}$ for moving the rack-bar in one direction, and a spring $a^{36}$ for moving it in the reverse direction, substantially as described.

4. The combination, in a button-hole-stitching machine, of the barrel $a^7$, adapted to be turned or rotated during the stitching of the eye of the button-hole, the needle-bar $a^5$, carried by said barrel and rotated therewith, the needle carried by said needle-bar, the compound eccentric upon the shaft $a$, the pitman or connecting rod $a^{11}$, the lever $a^{12}$, and the sliding connection between the needle-bar and end of the lever in which the needle-bar is adapted to be turned, substantially as described.

5. The combination of the needle-bar, its operating-lever $a^{12}$, the link $a^{14}$, the end $a^{15}$ of which enters a hole in the end of the lever and has longitudinal movement or play therein, the collar $a^{17}$, pivoted to the end of the link and surrounding the sleeve $a^{18}$, and the said sleeve $a^{18}$, fastened to the needle-bar, the whole providing a construction whereby the location of the connecting device between the needle-bar and its operating-lever may be varied or changed upon the needle-bar, substantially as described.

6. The combination of the stationary bracket A', having the downwardly-extending section $a^{23}$, provided or formed with a cylinder-recess $a^{22}$ to receive a barrel $a^7$, with the said barrel having a flange and a shoulder, and plate $a^{25}$ for maintaining said barrel in said recess, the reciprocating needle-bar $a^5$, carried by said barrel, and means, such as a pinion and rack, for rotating the barrel, substantially as described.

7. The combination of the reciprocating needle-bar $a^5$ and needle $a'$, the rotary barrel $a^7$, in which the needle-bar is reciprocated and by which it is turned, and looping devices carried by said barrel, comprising the arms $a^{55}$ $a^{56}$, shaped, supported, and operated substantially as specified, all substantially as and for the purposes described.

8. The combination, in a button-hole-stitching machine, of the frame of the machine, having the slideway $c^4$, the slide-plate $c^3$, shaped substantially as specified and mounted therein, and means, substantially as specified, for providing it with an intermittent feeding movement forward and back, the laterally-movable plate $c^2$, mounted upon said slide-plate $c^3$, the clamp plate or plates and work-clamps carried by said plate $c^2$, means, substantially as specified, for providing said plate $c^2$ and the clamps with a transverse movement at the times indicated, stitch-forming devices adapted to be rotated in fixed or stationary sections of the frame, said stationary sections or supports for the stitch-forming devices, and means, such as pinions and racks, for rotating said stitch-forming devices during the traversing movement of the plate $c^2$ upon the plate $c^3$, as and for the purposes described.

9. The combination, in a button-hole-stitching machine, of the frame of the machine, having the slideway $c^4$, the slide-plate $c^3$, shaped substantially as specified and mounted therein, and means, substantially as specified, for providing it with an intermittent feeding movement forward and back, the laterally-movable plate $c^2$, mounted upon said slide-plate $c^3$, the clamp plate or plates and work-clamps carried by said plate $c^2$, means, substantially as specified, for providing said plate $c^2$ and the clamps with a transverse movement at the times indicated, stitch-forming devices adapted to be rotated in fixed or stationary sections of the frame, said stationary sections or supports for the stitch-forming devices, means, such as pinions and racks, for rotating said stitch-forming devices during the traversing movement of the plate $c^2$ upon the plate $c^3$, and means, such as springs, to turn or revolve backward the stitch-forming mechanism to its original position after the sewing of the last stitch, substantially as described.

10. In a button-hole-stitching machine, a clamp-plate made in two parts, a clamp-plate slide upon which said parts of the clamp-plate are movable transversely in relation to each other, a stationary spreading-pin C′, and means, such as a cam, for moving said clamp-plate slide toward and from said pin, substantially as and for the purposes described.

11. In a button-hole-stitching machine, the combination of the clamp-plates $c$ $c'$, the recess between the same, the inclined edges $c^{33}$ $c^{34}$, the stationary spreading-pin C′, and the stops $h'$ $h^2$, substantially as described.

12. In a button-hole-stitching machine, the combination of the bed having a slideway for a slide-plate, a slide-plate mounted to be moved in said slideway, a clamp-plate, spreading work-clamps carried by said slide-plate, a cam having a cam-groove $c^6$, constructed as specified and located in relation to the inner end of the slide-plate, as specified, and a cam-pin $c^7$, carried at the inner end of said slide-plate to enter said cam-groove $c^6$, in combination with rotary stitching devices of the character specified, all as and for the purposes described.

13. The combination, in a machine of the character specified, of the bed of the machine, having a slideway, a slide-plate mounted to be moved in said slideway, a rotary cam having the cam-groove $c^6$, constructed as specified and connected with the slide-plate by a cam-pin, whereby there is imparted to the slide-plate a movement forward for a stated distance and then a reverse feed movement for the same distance, a clamp-plate mounted on said slide-plate to be moved therewith, a cam $c^{25}$, connected with the clamp-plate to swing it at a stated period transversely upon the slide-plate, and rotary stitching devices of the character specified, substantially as described.

14. The combination, in a button-hole-stitching machine, of a slide-plate $c^3$ and means, such as an intermittently-rotated cam, connected with said slide-plate to impart to it an intermittent longitudinal movement forward and back upon the bed of the machine, a plate $c^2$, carried by said slide-plate $c^3$ and pivoted to the front end thereof, means, such as an intermittently-rotated cam, connected with said plate $c^2$ to impart to said plate an intermittent traversing movement during specified portions of the longitudinal movement of the slide-plate, the clamp-plate C, mounted upon said plate $c^2$, the working spreading-clamps carried thereby, fixed supports above and below the plane of movement of the said slide-plate, stitch-forming devices mounted in said fixed supports in a manner to permit them to be rotated, and mechanism, such as specified, for holding the said stitch-forming devices stationary during a portion of the movement of the slide-plate, and for then rotating them a half-revolution, as and for the purposes described.

15. The combination, in a button-hole-stitching machine, of the bed of the machine, having a slideway therein, a slide-plate mounted in said way and having a backward extension, a clamp-plate mounted upon said slide-plate, work-spreading clamps carried by said clamp-plate, a cam-shaft, a worm-wheel upon said shaft, an intermittently-rotated worm to engage said worm-wheel, a cylinder-cam at the forward end of said cam-shaft, a cam-pin connecting said slide-plate with the cylinder-cam, fixed supports above and below the plane of movement of the slide-plate, stitch-forming devices mounted in each of said fixed supports to be rotated at specified times, and devices, substantially as specified, for holding the said stitch-forming devices fixed and for imparting to them a rotary movement, as and for the purposes described.

16. The combination, in a button-hole-stitching machine, of the frame having a slideway, a slide-plate mounted in said slideway, a clamp-plate mounted upon said slide-plate to be movable transversely, work-spreading-clamps carried by said clamp-plate, a cam mounted upon a cam-shaft and connected with the clamp-plate, constructed to impart to the clamp-plate a traversing movement during the stitching of the eye of the button-hole, the cam-shaft, a worm-wheel upon said shaft, an intermittently-rotated worm for imparting intermittent movements to said worm-wheel and shaft, fixed supports above and below the plane of movement of the clamp-plate, stitch-forming devices adapted to be rotated, held by said supports, and means, substantially as specified, for rotating said stitch-forming devices during the traversing movement of the clamp-plate, as and for the purposes described.

17. The combination of a cam for moving a clamp-plate longitudinally forward and back, connected with the clamp-plate by suitable connecting mechanism, a cam for imparting to said clamp-plate a transverse movement during its longitudinal movement, connected with said clamp-plate by suitable connecting mechanism, the said clamp-plate, stitching mechanism supported in blocks adapted to be turned during the transverse movement of the clamp-plate, a cam connected with said blocks by appropriate mechanism for turning the same, a shaft B, supporting said last-named cam, the cams for operating the clamp-plate, a worm-wheel upon said shaft, and a worm connected therewith, having an intermittent movement imparted to it, as and for the purposes described.

18. The combination, in a button-hole-stitching machine, of the stitch-forming devices supported in blocks adapted to be turned, a cam constructed, substantially as specified, for partially rotating the stitch-forming devices in one direction only, a shaft B, upon which said cam is mounted, connecting devices, substantially as specified, connecting the cam with the said rotary blocks, a worm-wheel upon said shaft B, and a worm connected therewith, having an intermittent movement imparted to it, substantially as specified.

19. The combination of a cam for turning the stitch-forming devices and suitable mechanism connecting it therewith, said stitch-forming devices, a shaft upon which said cam is mounted, a worm-wheel upon said shaft, an intermittently-rotated worm connected with said worm-wheel, and a spring operating upon the mechanism connecting the cam with said sewing mechanism, adapted to be released by the cam to return the sewing and turning mechanism to their original position upon the completion of the sewing of the last side of the button-hole, substantially as described.

20. The combination, in a button-hole-stitching machine, of the frame of the machine, having a slideway, a slide-plate mounted in said way, means, substantially as specified, for providing it with an intermittent feeding movement forward and back, a work-clamp plate and work-spreading clamps mounted thereon, carried by the slide-plate, means, substantially as specified, for imparting to it traversing movements upon the slide-plate at and near the end of its forward movement, fixed supports above and below the plane of movement of the slide-plate, stitch-forming devices carried thereby, means substantially as specified, for holding them stationary and for rotating them in said fixed supports, a button-hole cutter attached to a stationary arm of the machine to occupy the relation to the clamp-plate and throw of the means specified, a stationary anvil for the same and means for operating the button-hole cutter, as and for the purposes described.

21. The combination of the work-clamp plate comprising the sections $c$ $c'$, having the inclined edges $c^{33}$ $c^{34}$ and the recess, with the clamps $d'$ $d^2$, one of which is pivoted to the section $c$ of the clamp-plate and the other to the section $c'$, the cross-bar $d^{10}$, bearing upon the arms of the clamp, and the eccentric $d^{13}$ on the shaft $d^{14}$ for operating said cross-bar, substantially as described.

22. The combination of the work-clamp plate comprising the sections $c$ $c'$, having the inclined edges $c^{33}$ $c^{34}$ and the recess, with the clamps $d'$ $d^2$, one of which is pivoted to the section $c$ of the clamp-plate and the other to the section $c'$, the cross-bar $d^{10}$, bearing upon the arms of the clamp, the eccentric $d^{13}$ on the shaft $d^{14}$ for operating said cross-bar, and an automatic latching device, substantially as described.

23. The combination of the work-clamp plate comprising the sections $c$ $c'$, having the inclined edges $c^{33}$ $c^{34}$ and the recess, with the clamps $d'$ $d^2$, one of which is pivoted to the section $c$ of the clamp-plate and the other to the section $c'$, the cross-bar $d^{10}$, bearing upon the arms of the clamp, the eccentric $d^{13}$ on the shaft $d^{14}$ for operating said cross-bar, and an automatic latching device and automatic mechanism for tripping the latching device at the end of the stitching of the button-hole, substantially as described.

24. In a button-hole-stitching machine, the combination of the clamp-plate, suitable connecting devices, the cam-shaft C, the worm-wheel $c^9$, the worm engaging said worm-wheel, the driving-shaft $a$, and mechanism connecting the driving-shaft, comprising an eccentric $c^{12}$, a pitman $c^{13}$, lever $c^{14}$, cylinder $c^{15}$, block $c^{16}$ within the cylinder, shaped as specified, and the rolls $c^{19}$, substantially as described.

25. The combination, in a button-hole stitching and barring machine, of a clamp-plate, work-spreading clamps carried thereby, means, substantially as specified, for imparting longitudinal and traversing movements to the said clamp-plate and clamps, the fixed supports for the stitching devices above and below plane of movement of the clamp-plate, stitching devices mounted to be rotated in said supports, means, substantially as specified, for holding the stitching devices stationary during the stitching of the sides of the button-hole and for rotating them about the eye of the button-hole, and mechanism for moving transversely the needle of one of the stitch-forming devices in relation to the needle of the other stitch-forming device at the completion of the stitching of the last side of the button-hole, as and for the purposes described.

26. The combination, in a button-hole stitching and barring machine, of the pulley-shaft $a$, the upper and lower needle-bars and their respective needles, the barrels, the blocks supporting the same, the looping devices and eccentrics upon the main shaft connected with the upper and lower needle-bars, as specified, eccentrics upon said pulley-shaft, connected with each set of looping devices, as described, a cam-shaft intermittently rotated from the main shaft by means of a worm intermittently turned and engaging a worm-wheel upon the cam-shaft, and said worm-wheel and cams upon the cam-shaft for rotating the blocks or barrels of the stitching devices and for moving the clamp-plate longitudinally and transversely, as and for the purposes specified.

27. The combination, in a button-hole-stitching machine, of the frame of the machine, having a slideway, a longitudinally-movable slide mounted in said slideway, a plate $c^2$, carried by said slide-plate, the clamp-plate and clamps mounted upon said plate $c^2$, the cam $c^{24}$, having cam-groove $c^{25}$, a lever $c^{27}$, connected at one end by a loose or free connection with said plate $c^2$ and having at the other end a cam-pin to engage said cam-groove, fixed supports above and below the plane of movement of said slide-plate, stitch-forming devices mounted in said supports, adapted to be held stationary during a certain portion of the movement of the slide-plate and then to be rotated, and means, substantially as specified, for holding and rotating said stitch-forming devices, as and for the purposes described.

28. The combination of the looper-lever $a^{37}$, having a looper-arm $a^{55}$ pivoted in a recess of the barrel, the vertically-movable slide $a^{40}$, and link $a^{42}$, substantially as described.

29. The combination of a barrel having a recess in which the looping-lever is pivoted, and operating-lever, a yoke movable by said lever and connected with a slide $a^{40}$, arranged to slide in the barrel and movable about said yoke, and a link connecting the slide with the looper-lever, substantially as described.

30. The combination of the looper-lever and looper carried thereby, shaped substantially as specified and having movements imparted to it substantially as described, with a sleeve upon the lower end of the lever, the looper-arm $a^5$, shaped as described, and a sleeve-turning device comprising a pin or abutment $a^{64}$ and a stop $a^{65}$, carried by the barrel, substantially as described.

JAMES H. REED.
     CHARLES A. DAHL.

Witnesses to James H. Reed:
 F. F. RAYMOND, 2d,
 ARTHUR SIBLEY.
Witnesses to Charles A. Dahl:
 F. W. CONE,
 ARTHUR SIBLEY.